June 14, 1927.
E. PEARSON
TREAD BELT TRACTOR
Filed Dec. 19, 1924
1,632,674
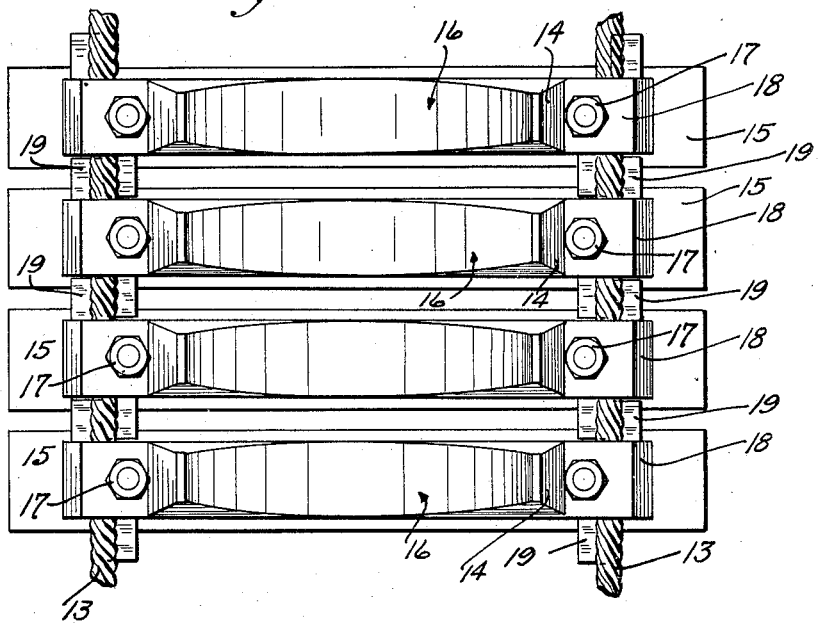
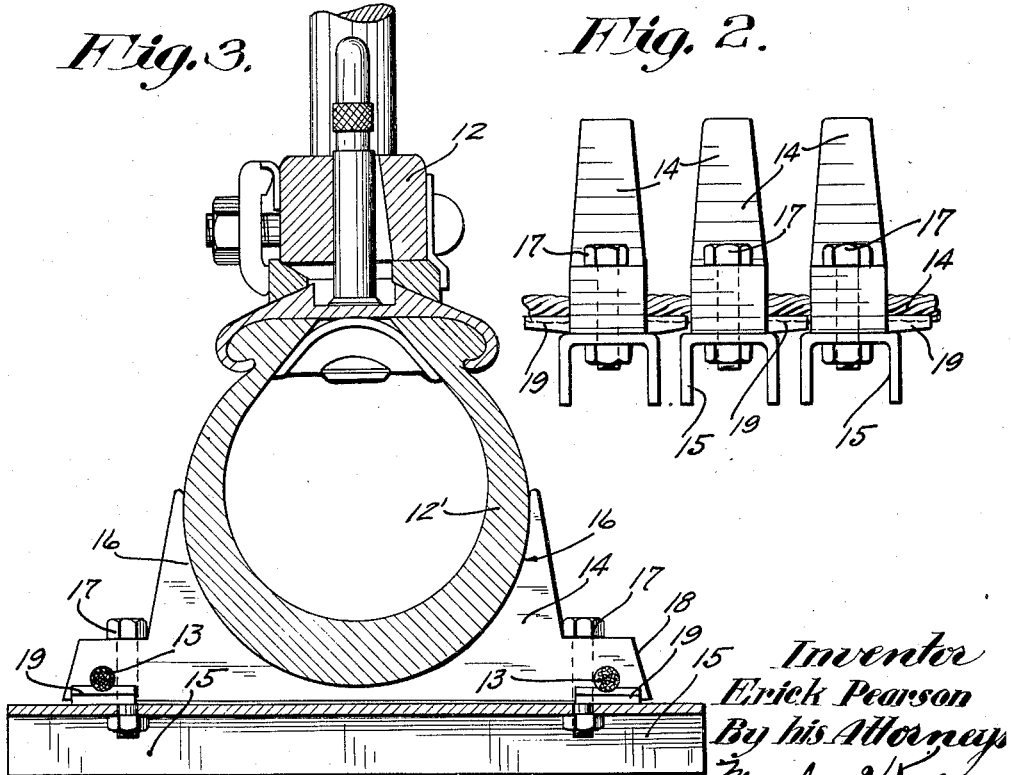
Inventor
Erick Pearson
By his Attorneys
Merchant & Nelson Patented June 14, 1927.

1,632,674

UNITED STATES PATENT OFFICE.

ERICK PEARSON, OF MINNEAPOLIS, MINNESOTA.

TREAD-BELT TRACTOR.

Application filed December 19, 1924. Serial No. 756,929.

My invention relates to that type of tractor wherein tread belts are arranged to run over traction wheels, and, generally stated, the invention consists of the novel devices and combinations of devices hereinafter described and defined in the claims.

Primarily, the invention is directed to the simplification of the construction and improvement of the operation of the tread belts of such tractors. Secondarily, the invention involves certain other novel features, as will hereinafter more fully appear.

The tread belts of tractors of the above type have hitherto very generally been made up of a plurality of very heavy belt sections or traction lugs and plates connected by pivot joints, which require oiling, are exposed to dirt and mud, and are subject to very rapid wear. Moreover, the said prior tread belts, in addition to being very heavy structures, have lacked certain flexibility, such as lateral yielding actions, which are very desirable to adapt the belt to irregularity in road surfaces.

My invention removes the above noted defects or objectionable features and provides a tread belt of very simple and relatively light construction, which, nevertheless, has all of the desired or necessary strength, has great lateral flexibility in addition to the flexibility required for movement around the traction wheels and, moreover, has no pivot joints. Generally stated, the tread belt involves a pair of flexible metal cables and properly spaced traction lugs that are attached to and form cross-connections between the two cables. The cables thus connect the traction lugs for very free and substantially universal movements within certain limits required for the desired flexibility of the belt, but the cables hold the lugs so associated that they form the best kind of a track over which the traction wheels will run.

In the accompanying drawings, which illustrate the invention, like characters indicate like parts throughout the several views.

Referring to the drawings:

Fig. 1 is a plan view showing a part of the lower portion of one of the thead belts;

Fig. 2 is a side elevation of the parts shown in Fig. 1; and

Fig. 3 is a transverse section showing a tread belt of a pneumatic tire equipped wheel.

The numeral 12 indicates one of the tandem wheels of a tractor equipped with a pneumatic tire 12' over which one of the tread belts is arranged to run.

The tread belts, of which there is, of course, one at each side of a tractor, each comprises a pair of laterally spaced endless wire cables 13 and, as above indicated, also a series of closely spaced traction lugs. In this preferred arrangement, each complete traction lug comprises a saddle bar 14 and a traction bar 15. The saddle bars 14, in the construction illustrated, are arranged to engage the pneumatic tire 12' and, hence, are formed with concave seats 16 that quite closely fit said tire. The traction bars 15 are preferably rolled steel channel bars and they are rigidly but detachably secured to the saddle bars 14 by nut-equipped bolts 17 passed through the webs thereof and through the reduced outwardly projecting ends 18 of said saddle bars. Adjacent to the backs of the traction bars 15, the projecting ends 18 of the saddle bars 14 are notched to fit metallic strips 19 that serve slightly to space the bars 14 from the backs of the bars 15, and in the preferred arrangement, perform two additional functions presently to be noted. Adjacent to the strips 19, the ends 18 of the bars 14 are notched to form seats through which the cables 13 are passed, but these notches are of such depth that they do not completely contain the said cables and so that, when the nuts on the bolts 17 are tightened, the strips 19 will be tightly pressed against the cables and thus securely anchor the complete lugs to the cables. As best shown in Fig. 1, the metal strips 19 are provided with laterally offset ends that project in opposite directions on opposite sides of the cables and are extended so that they will slightly overlap the tops of adjacent traction bars 15 at the straight portions of the belt and thus tend to keep the said bars 15 in horizontal alignment as they travel between the front and rear traction wheels. As has now been described, the said strips 19 serve first as shims to slightly space the bars 14 and 15, second as clamps or clips to secure the traction lugs to the cables, and third as aligning fingers for the several complete traction lugs.

Obviously, the belt made up of the cables and traction lugs will have great flexibility, the flexibility being given by the cables and, at the same time, the belts will be very strong and subject to very little wear, for there are no pivot joints to be worn either by the ordinary friction or by the accumulation of dirt, sand, and mud. Belts of this kind will adapt themselves to road or surface irregularities, will have very great tractive contact with the ground and will lay the best kind of endless tracks for the traction wheels. Such belts are especially well adapted for application to the wheels of trucks and the like equipped with pneumatic tires, but, of course, they are not limited to such particular application.

From what has been said, it will be understood that, when the improved tread chain is to be applied to wheels having flat rims or any other form of rim, the saddle bars 14 will be shaped to properly fit and embrace the particular tire in connection with which the tread belt is to be used.

What I claim is:

1. A tread belt for tractors of the tread belt type, comprising laterally spaced endless wire cables and cross-connected traction lugs, said lugs including a saddle bar, a traction bar, clamping strips, and nut-equipped bolts connecting said bars, said cables being passed through notches in said saddle bars and tightly clamped thereto by said clamping strips by pressure produced by the tightening of said nut-equipped bolts.

2. The structure defined in claim 1 in which said clamping strips project longitudinally of the belt and are adapted to overlap portions of adjacent traction bars.

3. The structure defined in claim 1 in which said clamping strips are provided with laterally offset ends projecting in opposite directions longitudinally of the belt and at their projecting ends are arranged to overlap portions of adjacent traction bars.

4. In a tread belt for tractors, a pair of laterally spaced endless wire cables, saddle bars having concave surfaces adapted to engage a traction wheel tire and having reduced ends, notches in the reduced ends of said saddle bars in which said cables are seated, flanged traction bars aligned with the respective saddle bars, clamping strips interposed between said bars and directly engaging said cables and holding said bars slightly spaced, and nut-equipped bolts passed through the reduced ends of said saddle bars and through the webs of said traction bars and serving to rigidly connect cooperating bars together and to anchor the same to said cables.

In testimony whereof I affix my signature.

ERICK PEARSON.